H. REISERT.
FILTER.
APPLICATION FILED APR. 11, 1914.

1,142,270.

Patented June 8, 1915.

Witnesses:
Inventor
Hans Reisert
By his Attorney

UNITED STATES PATENT OFFICE.

HANS REISERT, OF COLOGNE, GERMANY.

FILTER.

1,142,270.

Specification of Letters Patent.

Patented June 8, 1915.

Application filed April 11, 1914. Serial No. 831,182.

*To all whom it may concern:*

Be it known that I, HANS REISERT, a subject of the Empire of Germany, and residing in Cologne, Germany, have invented certain new and useful Improvements in Filters, of which the following is a specification.

This invention relates to filters of that kind in which means are provided for collecting an adequate supply of filtered water beneath the filter bed and for driving the same backward by air pressure through the filter bed for rapid washing, the passages which the water traverses in this operation being of wide cross-section so that the entire mass of filter material is at once lifted into a floating condition.

Heretofore metal tubes have been used as the means of communication between the reservoir spaces and the filter beds, as shown in my prior Patent No. 895,198 of August 4, 1908.

The object of the present invention is to produce a construction whereby in the washing operation the action of the water upon the various parts of the filter bed is even more prompt and uniform.

The object is also to produce a cheaper construction, and one which is not subject to corrosion.

Still another object is to facilitate repair.

These ends are attained by constructing the filter with a horizontally-extending duct beneath the bed, to serve as the vertical passage between the reservoir and the bed.

Figure 3:
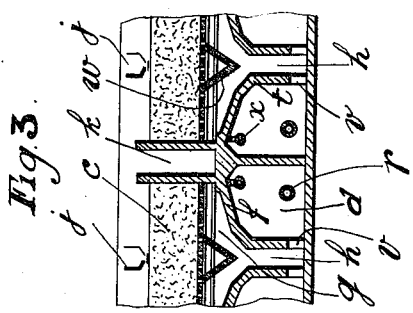
Figure 4:
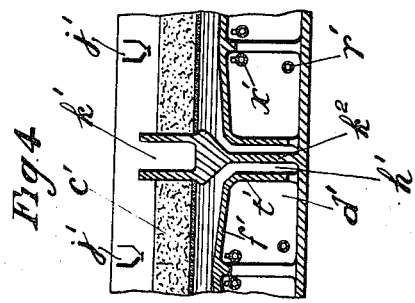
Figure 1:
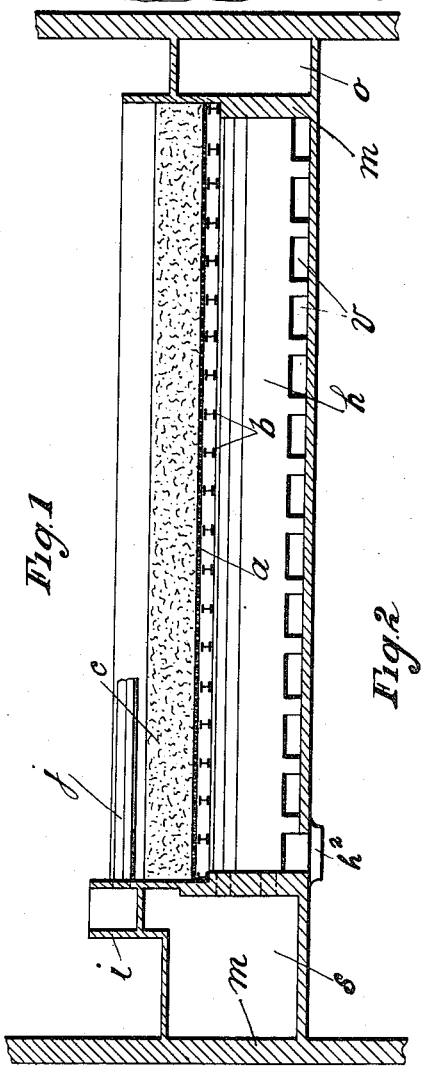
Figure 2:
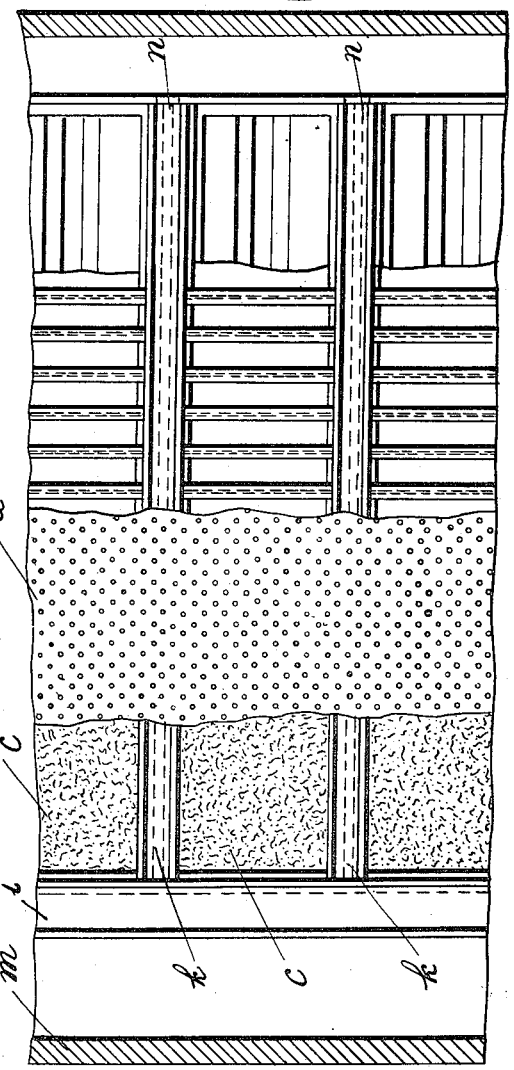

In the accompanying drawings illustrating the invention: Figure 1 is a vertical section taken transversely of a series of filter beds and lengthwise through one of them; Fig. 2 is a fragmentary plan view, parts being successively broken away to reveal parts beneath; Fig. 3 is a fragmentary vertical section taken at right angles to Fig. 1; and Fig. 4 is a view similar to Fig. 3, showing a modification.

In the practical embodiment of the invention illustrated in Figs. 1 to 3, a series of elongated filter beds $c$, disposed side by side, are supported within masonry inclosing walls $m$ upon a perforated bottom $a$, in turn supported by beams $b$. For convenience the latter are shown as I beams, but in practice reinforced concrete beams are preferred. The beds are separated from each other by overflow channels $k$, for receiving the muddy wash water, these channels in turn emptying, as indicated at $n$, into a channel or chamber $o$, running transversely to the beds and channels $k$, at one end directly into the sewer. From the channel the muddy water is discharged in any suitable manner.

Beneath the filter beds are covered reservoir chambers $d$, also constructed of masonry in the form of the invention illustrated. These chambers deliver at one end, in a suitable manner, to a discharge system. As indicated at $r$, this may be a common chamber or channel $s$, from which the filtered water is drawn off for use. The roofs $f$ of these chambers are separated from the filter beds by a space $g$, and their side walls $t$ form also the sides of ducts $h$. These ducts extend horizontally between or alongside the reservoir chambers, lengthwise beneath the beds. In the preferred construction there is a duct centrally beneath each bed. At the bottom the ducts communicate with the lower parts of the reservoir chambers by opening $v$ in the walls $t$. Obviously these walls might merely terminate short of the bottom. At the top the ducts open into the space $g$ aforesaid. Preferably the roofs $f$ slope laterally toward the ducts, as in this way a cross-section of the space $g$ is secured which facilitates the prompt and uniform distribution of the wash water to the entire bottom of the bed. To further assist in uniformly distributing the water a perforated baffle $w$ is disposed in the space $g$ over each of the ducts. It will be observed that the roofs $f$ of the reservoir chambers in effect constitute a false bottom, through which the ducts open into the space beneath the filter beds.

The capacity of the reservoir chambers is such as to afford an ample supply of wash water when needed, and the cross-sections of the passages through which the water must flow are sufficiently wide to insure a general lifting of the material of the filter bed. For best results the total area of the openings in the perforated support $a$ beneath each bed is less than the cross-sectional area of the duct $h$. The latter is greater than the area of the openings $v$ at the bottom of the duct; and at the top of the latter the space $g$ presents a widening cross-sectional area. By these relative proportions the velocity of the water changes gradually, and a prompt and uniform distribution of the water in washing is secured with a moderate degree of pressure.

The air under pressure for forcing the filtered water in the reservoir chambers and ducts backward through the beds is supplied to said chambers above the water line by means of any suitable character, as indicated at $x$.

In normal operation, raw water is supplied over the top of the filter beds from gutters $i$ communicating with a common supply gutter $j$, passes therethrough, down through the ducts $h$ and into the chambers $d$. From thence the filtered water is allowed to pass to the chamber $s$, the rate of egress being controlled in any suitable manner. The reservoir chambers always contain an adequate supply of water for washing the beds; and when this is to be performed the exits therefrom are closed and air pressure is admitted, with the result that the water is driven out and upward through the ducts, and through the beds, in the reverse direction to the filtering operation. A further advantage of the ducts $h$ is that they are of such size as to constitute passageways for workmen, for the purpose of inspection and repair of the filter. A suitable manhole indicated at $h^2$ affords entrance to the ducts.

In the modified construction shown in Fig. 4, a single chamber $d'$ is placed beneath each bed $c'$; and the overflow channels $k'$, instead of being supported on the chambers $d$ as in the other construction, are supported on special walls $k^2$. The ducts $h'$ are formed by these walls and the side walls $t'$ of the reservoir chambers. There are thus two ducts for each bed, beneath the opposite sides thereof. In general, the construction is like the other form, and similar parts will be found designated by similar reference characters with supernumerals. The masonry employed in the construction of the walls of the ducts $h$ and $h'$ and the other walls of the filter is preferably monolithic reinforced concrete.

What I claim as new is:

1. A filter, comprising a filter bed, a reservoir chamber below the bed into which chamber air pressure may be introduced for driving the filtered water backward through the bed, and a duct affording vertical communication between said bed and the lower part of said reservoir chamber, said duct extending in a horizontal direction beneath said bed and being of a size to permit the passage of a workman along said duct.

2. A filter, comprising masonry inclosing walls, filter beds supported therein, covered reservoir chambers beneath said beds for the introduction of air pressure to drive the filtered water backward through the bed, and ducts extending longitudinally between said chambers and affording vertical communication between the lower parts of the same and the space immediately beneath the beds, said chambers and ducts having masonry walls.

3. In a filter, the combination with a filter bed, of one or more reservoir chambers beneath said bed with a space between their roofs and said bed, said chambers having suitable means for introducing air under pressure therein to force the filtered water backward rapidly through the bed, and one or more ducts extending horizontally alongside said chambers, said ducts communicating with said chambers by openings at the bottom of the side walls thereof and at the top opening into said space.

4. A filter having a filter bed or beds, one or more wash-out chambers beneath the same, and one or more ducts extending horizontally alongside said chambers, said chambers and ducts having masonry walls and the chambers also having masonry roofs which slope laterally toward the ducts, the ducts communicating at the bottom with said chambers and at the top with the spaces between said roofs and the filter beds.

5. In a filter, the combination of a plurality of elongated filter beds disposed side by side, covered reservoir chambers beneath the beds having suitable means for introduction of air under pressure, and ducts extending the length of the beds beneath the same and affording communication between the beds and the lower parts of said chambers.

6. In a filter, the combination of a filter bed, a false bottom below the same, and a duct extending horizontally centrally beneath said bed and opening through said false bottom, there being means at the side of said duct and communicating with the bottom thereof for collecting the filtered water and for receiving air under pressure when it is desired to wash out the filter bed by back-flow.

7. In a filter, a filter bed and means beneath the same for collecting an adequate supply of filtered water and for receiving air under pressure when desired to force said water backward through the bed, in combination with a vertical duct affording communication between the bed and the lower part of said means, said duct extending horizontally beneath the bed and being of a size to permit the passage of a workman along the same, said duct increasing in cross-section toward the top.

8. In a filter, the combination of a filter bed, one or more reservoir chambers beneath the same having means for admitting air under pressure, and a duct extending horizontally beneath the bed, said duct communicating with said chambers at the bottom and opening at the top into a space immediately beneath the bed, and a perforated baffle in said space above said duct.

9. In a filter, the combination of a filter bed, one or more reservoir chambers beneath the same having means for admitting air under pressure, and a duct extending horizontally beneath the bed, said duct communicating with said chambers at the bottom and increasing in cross-section toward the top where it opens into a space extending beneath the bed.

10. In a filter, the combination of a filter bed, a perforated support therefor, one or more reservoir chambers beneath the same having means for admitting air under pressure, and a duct extending horizontally beneath the bed, said duct communicating with said chambers at the bottom and increasing in cross-section toward the top where it opens into a space extending beneath the bed, the area of the perforations in said support being less than the cross-section of the lower part of said duct.

In testimony whereof, I have signed my name to this specification, in the presence of two subscribing witnesses.

HANS REISERT.

Witnesses:
 LOUIS VANDORY,
 JETT VOMEFURT.